United States Patent
Mullally et al.

(10) Patent No.: US 12,381,791 B2
(45) Date of Patent: Aug. 5, 2025

(54) SEPARATION OF NETWORK FUNCTION AND ITS REALIZATION

(71) Applicant: Telefonaktiebolaget LM Ericsson (publ), Stockholm (SE)

(72) Inventors: Cormac Mullally, County Roscommon (IE); Michael Lundkvist, Linköping (SE); Brian Sweeney, Dysart County Roscommon (IE); Dermot Melia, Westmeath (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/282,612

(22) PCT Filed: Mar. 25, 2021

(86) PCT No.: PCT/EP2021/057850
§ 371 (c)(1),
(2) Date: Sep. 18, 2023

(87) PCT Pub. No.: WO2022/199825
PCT Pub. Date: Sep. 29, 2022

(65) Prior Publication Data
US 2024/0179079 A1    May 30, 2024

(51) Int. Cl.
*H04L 41/5054* (2022.01)
*H04L 41/122* (2022.01)

(52) U.S. Cl.
CPC ........ *H04L 41/5054* (2013.01); *H04L 41/122* (2022.05)

(58) Field of Classification Search
CPC ... H04L 41/12; H04L 41/122; H04L 41/5054; H04L 41/34; H04L 41/342; H04L 41/344; H04L 41/40
See application file for complete search history.

(56) References Cited

U.S. PATENT DOCUMENTS

| | | | |
|---|---|---|---|
| 10,772,062 B1 * | 9/2020 | Albasheir | H04L 67/1034 |
| 11,303,501 B2 * | 4/2022 | Chou | H04L 41/0895 |

(Continued)

FOREIGN PATENT DOCUMENTS

| | | |
|---|---|---|
| WO | 2020103925 A1 | 5/2020 |
| WO | 2020135799 A1 | 7/2020 |

OTHER PUBLICATIONS

3rd Generation Partnership Project, "3rd Generation Partnership Project; Technical Specification Group Services and System Aspects; Management and orchestration; 5G Network Resource Model (NRM); Stage 2 and stage 3 (Release 16)", 3GPP TS 28.541 v16.6.0 (Sep. 2020), Technical Specification, pp. 1-447.

(Continued)

*Primary Examiner* — Rachel J Hackenberg
(74) *Attorney, Agent, or Firm* — COATS & BENNETT, PLLC

(57) ABSTRACT

A network node modifies an association between the 3GPP defined Network Functions (NFs) and one or more cloud-native services thereby changing how those NFs are realized by the cloud-native services. To accomplish this, the node (200) "decouples" the NFs from the cloud-native services such that the NFs are unaware of the underlying cloud-native services that realize them and orchestrates the cloud-native services executing in the cloud that will realize those NFs. Additionally, the node automatically deploys, upgrades, scales, and heals the cloud-native services, as well as exposes the NFs and their interfaces, thereby facilitating the management of fault, configuration, accounting, performance, and security (FCAPS).

14 Claims, 17 Drawing Sheets

(56) References Cited

U.S. PATENT DOCUMENTS

| | | | |
|---|---|---|---|
| 2019/0273666 A1* | 9/2019 | Chou | H04L 41/0895 |
| 2021/0112404 A1* | 4/2021 | Xin | H04M 15/58 |
| 2021/0326167 A1 | 10/2021 | Yang | |
| 2022/0075666 A1* | 3/2022 | Xia | H04L 67/51 |

OTHER PUBLICATIONS

3rd Generation Partnership Project, "3rd Generation Partnership Project; Technical Specification Group Radio Access Network; NG-RAN; Architecture description (Release 16)", 3GPP TS 38.401 V16.2.0 (Jul. 2020), Technical Specification, pp. 1-77.

Bonati, L., et al., "Open, Programmable, and Virtualized 5G Networks; State-of-the-Art and the Road Ahead", Institute of the Wireless Internet of Things, Northeastern University, Boston, MA 02115, USA, Preprint submitted to Computer Networks, May 22, 2020, pp. 1-66.

ETSI, "Network Functions Virtualisation (NFV) Release 2; Protocols and Data Models; RESTful protocols specification for the Or-Vnfm Reference Point", ETSI GS NFV-SOL 003 V2.8.1 (Aug. 2020), Group Specification, pp. 1-302.

O-RAN, "O-RAN Architecture Description", O-RAN-WG1-O-RAN Architecture Description—v01.00.00, Technical Specification, pp. 1-24.

ESTI, "Network Functions Virtualisation (NFV) Release 2; Protocols and Data Models; RESTful protocols specification for the Os-Ma-nfvo Reference Point", ETSI GS NFV-SOL 005 V2.8.1 (Sep. 2020), Group Specification, pp. 1-326.

ESTI, "Zero-touch network and Service Management (ZSM); Landscape", Draft ETSI GR ZSM 004 V1.5.0 (Mar. 2021), Group Report, pp. 1-88.

O-RAN, "O-RAN Working Group 1 Use Cases Detailed Specification", O-RAN.WG1.Use-Cases—Detailed Specification—v02.00, Technical Specification, pp. 1-46.

O-RAN, "O-RAN WG1 Operations and Maintenance Architecture v02.00", O-RAN-WG1.OAM—Archictrecture—V02.00, Technical Specification, pp. 1-37.

* cited by examiner

SEPARATION OF NETWORK FUNCTION AND ITS REALIZATION

TECHNICAL FIELD

This application relates generally to communication networks, and more particularly to apparatuses and methods for managing cloud-native services associated with such networks.

BACKGROUND

One of the primary functions of a Radio Access Network (RAN) is to provide access for wireless devices, such as User Equipment (UE), to a communication network. There are various types of RANs, but over time, RANs have evolved according to various technologies—one of which is commonly known as 5G.

5G RANs comprise a logical radio node referred to as a "gNB." As specified in the 3GPP Technical Specification 38.401 ("NG-RAN; Architecture description" v 16.4.0, Jan. 4, 2021), a gNB typically consists of several Network Functions (NFs). These include a gNB Centralized Unit Control Plane (gNB-CU-CP), multiple gNB Centralized Unit User Planes (gNB-CU-UPs), and multiple gNB Distribution Units (gNB-DUs). Configuration parameters for the NFs are specified in 3GPP Technical Specification 28.542 ("Management and orchestration of networks and network slicing; 5G Core Network (5GC) Network Resource Model (NRM); Stage 1).

Some manufacturers have virtualized the NFs in 5G RANs and manage them as Virtual Network Functions (VNFs). The life cycle of the VMFs are particularly managed according to the ETSI Management and Orchestration (MANO) standards specified, in part, in ETSI GS NFV-SOL 005 v2.4.1 (2018-02) and GS NFV-SOL 003 V2.3.1 (2017-07). According to these standards, a network operator can onboard a VNF package and manage the lifecycle (e.g., instantiate, upgrade, and terminate) of the VNF.

There are some documents related to the management of VNFs according to the ETSI MANO specifications. For example, WO2020103925A120200528 discloses running VNF containers (VNFCs) inside a container runtime environment. A VNF manager (VNFM) deploys the compositions of the containerized VNFs differently so as to improve the flexibility of the containerization VNF deployment. In another example, WO2020135799A120200702 discloses a VNFM deploying containers over multiple Containers as a Service (CaaS) clusters.

Additionally, a new type of RAN referred to as an Open-RAN (O-RAN) is currently being specified. The O-RAN defines a new architecture in which NFs are lifecycled on an Open-Cloud (O-Cloud) network using an O2 interface. The work on defining the O2 interface is just beginning; however, the NFs in an O-RAN expose an O1 operation and maintenance (O&M) interface to a Service Management and Orchestration (SMO) framework.

SUMMARY

The present disclosure provides a network node and corresponding methods for managing cloud-native services associated with 3GPP defined Network Functions (NFs). In more detail, the embodiments disclosed herein modify the association between the NFs and the cloud-native services thereby altering how those NFs are realized by the cloud-native services.

To accomplish this, one embodiment of the present disclosure provides a method, implemented by a node in a communications network, for managing the cloud-native services associated with a Radio Access Network (RAN). In this embodiment, the method comprises the network node receiving a service notification for an NF implemented by one or more cloud-native services, modifying the association between the NF and the one or more cloud-native services based on the service notification, and managing the one or more cloud-native services responsive to the modifying.

Additionally, one embodiment of the present disclosure provides a network node in a communications network. The network node is configured to manage cloud-native services associated with a Radio Access Network (RAN) and comprises communications interface circuitry configured to receive a service notification for a Network Function (NF) implemented by one or more cloud-native services, processing circuitry communicatively connected to the communications interface circuitry, and memory comprising instructions executable by the processing circuitry such that the node is configured to modify an association between the NF and the one or more cloud-native services based on the service notification, and manage the one or more cloud-native services responsive to the modifying.

In one embodiment, the present disclosure also provides a non-transitory computer-readable medium comprising a computer program stored thereon. In this embodiment, the computer program comprises instructions that, when executed by processing circuitry in a node configured to manage cloud-native services associated with a Radio Access Network (RAN), causes the node to receive a service notification for a Network Function (NF) implemented by one or more cloud-native services, modify an association between the NF and the one or more cloud-native services based on the service notification, and manage the one or more cloud-native services responsive to the modifying.

DETAILED DESCRIPTION

Embodiments of the present disclosure modify the association between the 3GPP defined Network Functions (NFs) and one or more cloud-native services thereby changing how those NFs are realized by the cloud-native services. To accomplish this, the present disclosure provides logic that, when executed by a node, configures the node to "decouple" the NFs from the cloud-native services (i.e., modify the association between the NFs and the cloud-native services such that the NFs are unaware of the underlying cloud-native services that realize them), and to orchestrate the cloud-native services executing in the cloud that will realize those NFs. Additionally, the logic provided by the present embodiments configures the node to automatically deploy, upgrade, scale, and heal the cloud-native services, as well as expose the NFs and their O&M interfaces thereby facilitating the management of fault, configuration, accounting, performance, and security (FCAPS).

Notably, the embodiments described herein still allow network operators to continue using 3GPP standardized procedures. As such, operators are still able to observe and configure their gNB-CU-CP, gNB-CU-UP, and gNB-DU network functions. Additionally, if desired, operators can terminate 3GPP defined standard protocols, such as F1-C, F1-U, E1, Xn/X2, and NG/S1.

Figure 1:
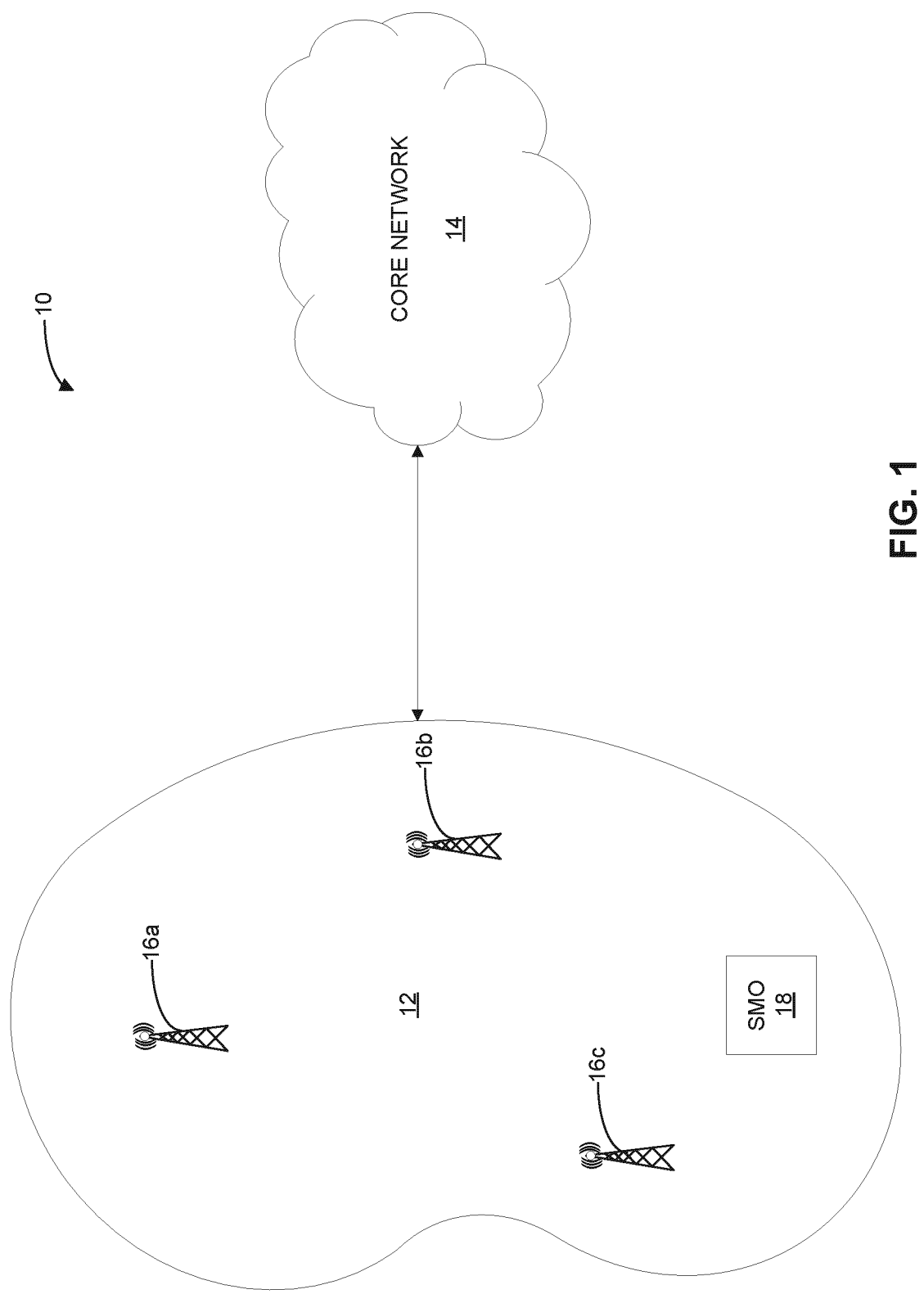
FIG. 1 is a functional block diagram illustrating a communication network configured according to one embodiment of the present disclosure.

Turning now to the drawings, FIG. 1 is a functional block diagram illustrating a communication network 10 configured according to one embodiment of the present disclosure. As seen in FIG. 1, network 10 comprises a RAN 12 communicatively connected to a 5G Core Network (CN) 14. The RAN 12 may be, for example, a 5G RAN that comprises a plurality of gNBs 16a, 16b, 16c (collectively or generally referred to as "gNBs 16"). Each gNB 16, as is known in the art, is a logical radio node configured to provide wireless access for one or more User Equipment (UEs) to the services offered by CN 14. In some embodiments, RAN 12 comprises an O-RAN. In these cases, RAN 12 may also comprise a Service Management and Orchestration (SMO) framework 18. As seen in more detail later, SMO 18 is configured to, inter alia, terminate O1 and O2 interfaces.

It should be noted here that FIG. 1 illustrates SMO 18 as being in the RAN 12. While this is an embodiment, those of ordinary skill in the art should appreciate that the present embodiments are not limited to such an SMO 18 placement. In other embodiments, for example, there are a plurality of SMOs 18—at least some of which are deployed at one or more Edge sites, regional sites, or national sites.

Figure 2:
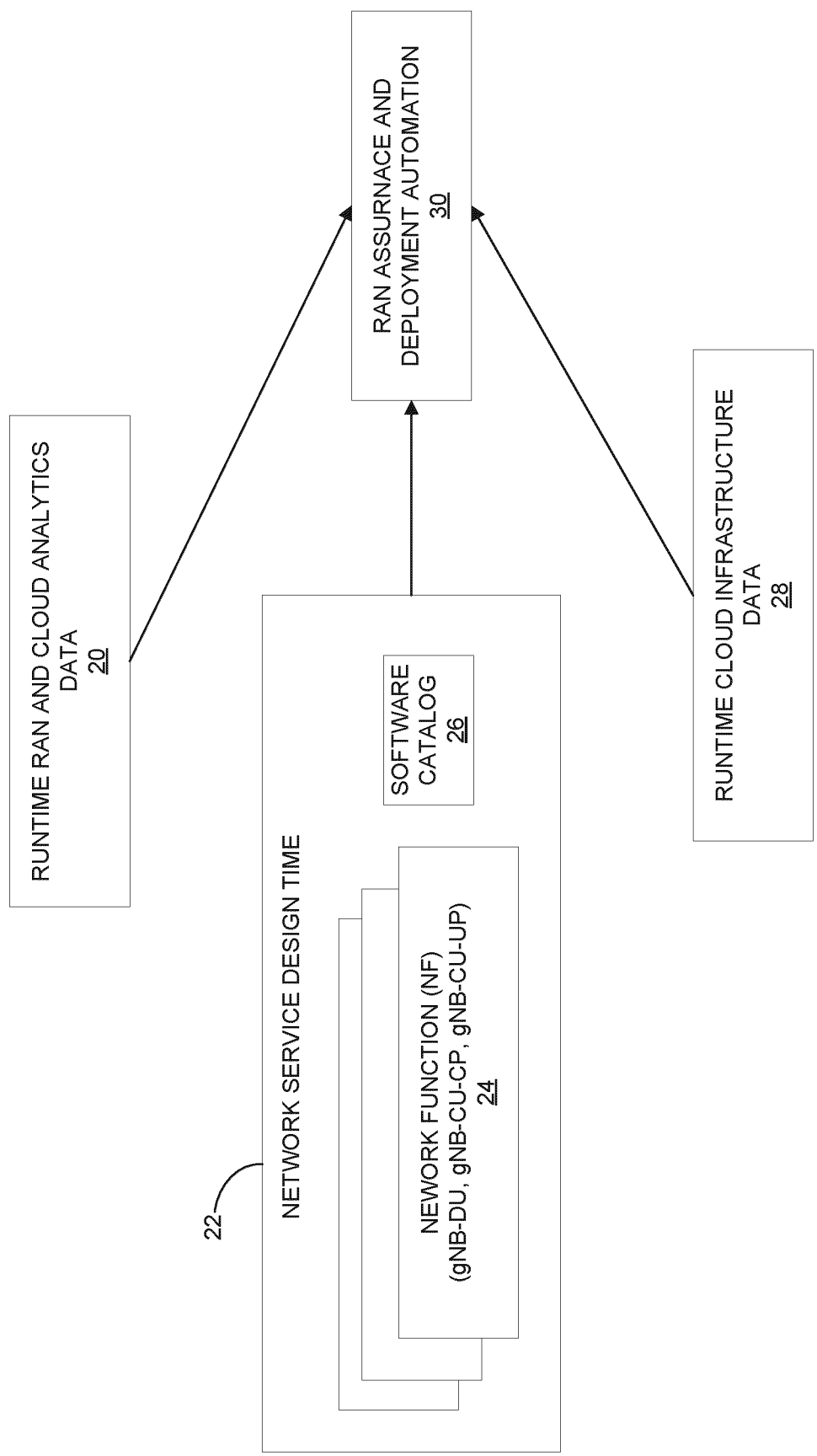
FIG. 2 is a functional block diagram illustrating information sources used according to one embodiment of the present disclosure.

FIG. 2 is a functional block diagram illustrating some of the information sources used according to one embodiment of the present disclosure. In more detail, FIG. 2 depicts a plurality of information sources, including two runtime sources and a design time source.

The runtime sources provide data collected during the runtime of NF services and/or cloud-native services and comprise a Runtime RAN and Cloud Analytics Data source 20 and a Runtime Cloud Infrastructure Data source 28. The Runtime RAN and Cloud Analytics Data source 20 can provide aggregated data collected at the NF level, or raw data from cloud-native services. Additionally, the Runtime RAN and Cloud Analytics Data source 20 can provide cloud analytics data collected from the cloud infra structure layer. Such data includes, but is not limited to, CPU-related data, memory usage data, and network throughput data. The Runtime Cloud Infrastructure Data source 28 provides data associated with the compute, storage, and networking layers, the availability and characteristics of which typically change over time.

The Network Service Design Time sources 22 provide data collected at design time. For example, a network operator may want to create an Enterprise Indoor Radio Access Network, which comprises gNB-CU-CP, gNB-CU-UP, and gNB-DU NFs 24. Each of these NFs 24 is linked to its software in a software catalog 26, which is continuously updated.

Figure 3:
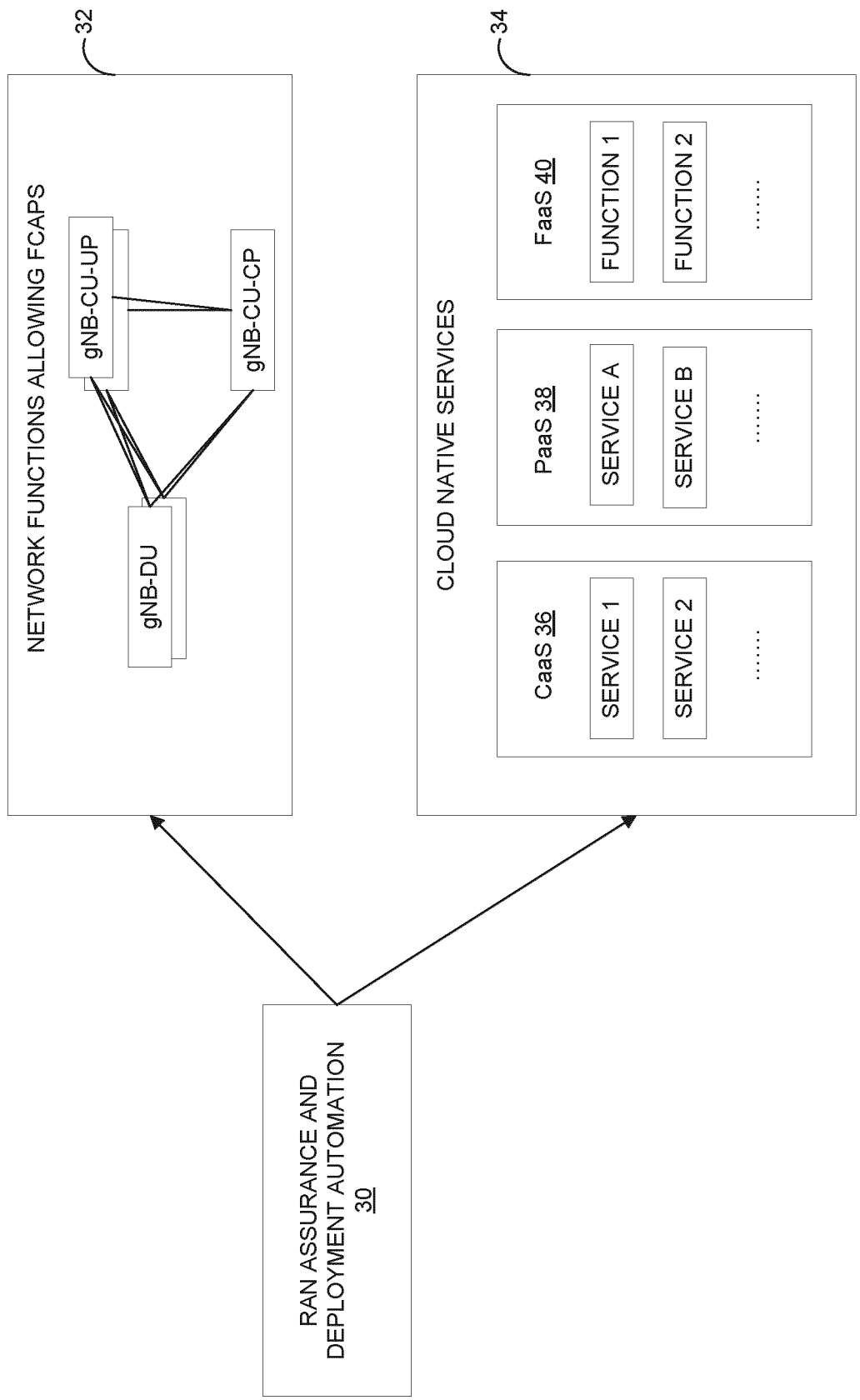
FIG. 3 is a functional block diagram illustrating how a RAN Assurance and Deployment Automation function manages the split between the NFs and cloud-native services according to one embodiment of the present disclosure.

The data from each of these sources is input into a RAN Assurance and Deployment Automation function 30, which as seen in FIG. 3, repeatedly reacts to changes from these sources. According to the present embodiments, RAN Assurance and Deployment Automation function 30 comprises logic that "decouples" the NFs from the cloud-native services. In other words, the RAN Assurance and Deployment Automation function 30 modifies an association between the NFs and the cloud-native services.

FIG. 3 is a functional block diagram illustrating how the RAN Assurance and Deployment Automation function 30 manages the decoupled NFs and cloud-native services according to one embodiment of the present disclosure. As seen in FIG. 3, the RAN Assurance and Deployment Automation function 30 manages the NFs and their external interfaces separately from the cloud-native services 34 and how they make up the NFs. Additionally, according to the present disclosure, different clouds and different cloud service models are suitable for use with the present embodiments. Such cloud service models include, for example, Container-as-a-Service (CaaS) 36, Platform-as-a-service (PaaS) 38, and Function as a service (FaaS) 40. Additionally, cloud-native services can be scaled and shared between many multiple NFs. Beneficially, these aspects are hidden from network operator's view of the NFs.

Figure 4:
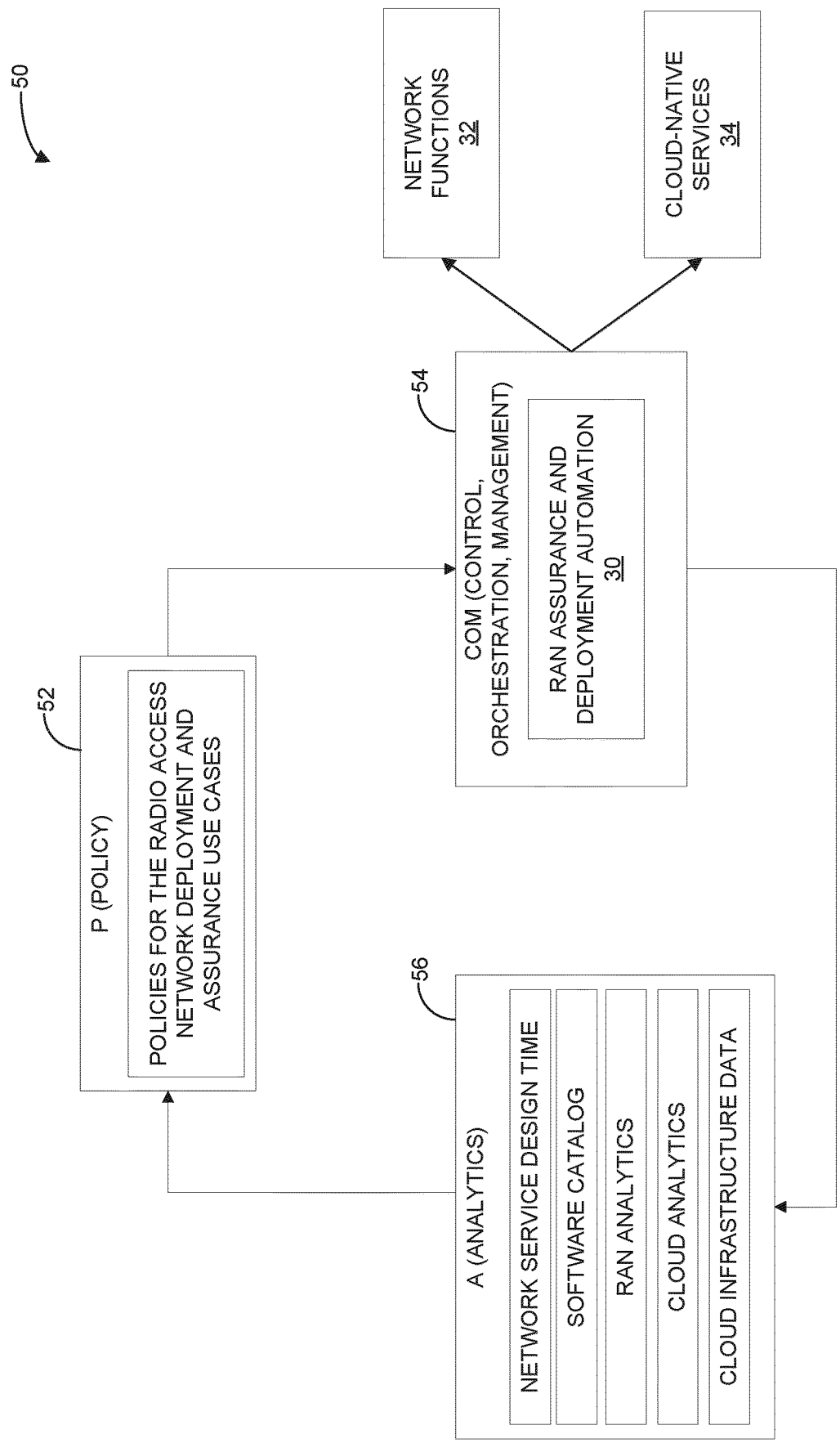
FIG. 4 is a functional block diagram illustrating a Control, Orchestration, Management, Policy, and Analytics (COMPA) loop configured according to one embodiment of the present disclosure.

FIG. 4 is a functional block diagram illustrating a Control, Orchestration, Management, Policy, and Analytics (COMPA) loop 50 configured according to one embodiment of the present disclosure. According to the present disclosure, the COMPA loop 50 automates the management of the cloud-native services and determines how the NFs are realized by the system.

As seen in FIG. 4, COMPA loop 50 comprises Policy function (52), a Control, Orchestration, and Management (COM) function 54 that includes the logic of the RAN Assurance and Deployment Automation function 30, and an analytics function 56. The Policies function 52 provides the policies as input for the RAN Assurance and Deployment use cases as input into the COM function 54. Upon receipt, COM function 54 manages the decoupled NFs 32 and cloud-native services 34 according to the policies, and outputs data and information to an analytics function 56. The analytics function 56 includes logic for analyzing the "design time" data provided by the Network Service Design Time sources 22 (i.e., the network services design time data for NFs 24 and the data in the software catalog 26), as well as the "runtime" data provided by the Runtime RAN and Cloud Analytics Data source 20 (i.e., the RAN analytics and the cloud analytics) and the Runtime Cloud Infrastructure Data source 28 (i.e., the cloud infrastructure data). The analysis is then used to update the policies, which, as stated above, are input into the COM function 54.

Figure 5A:
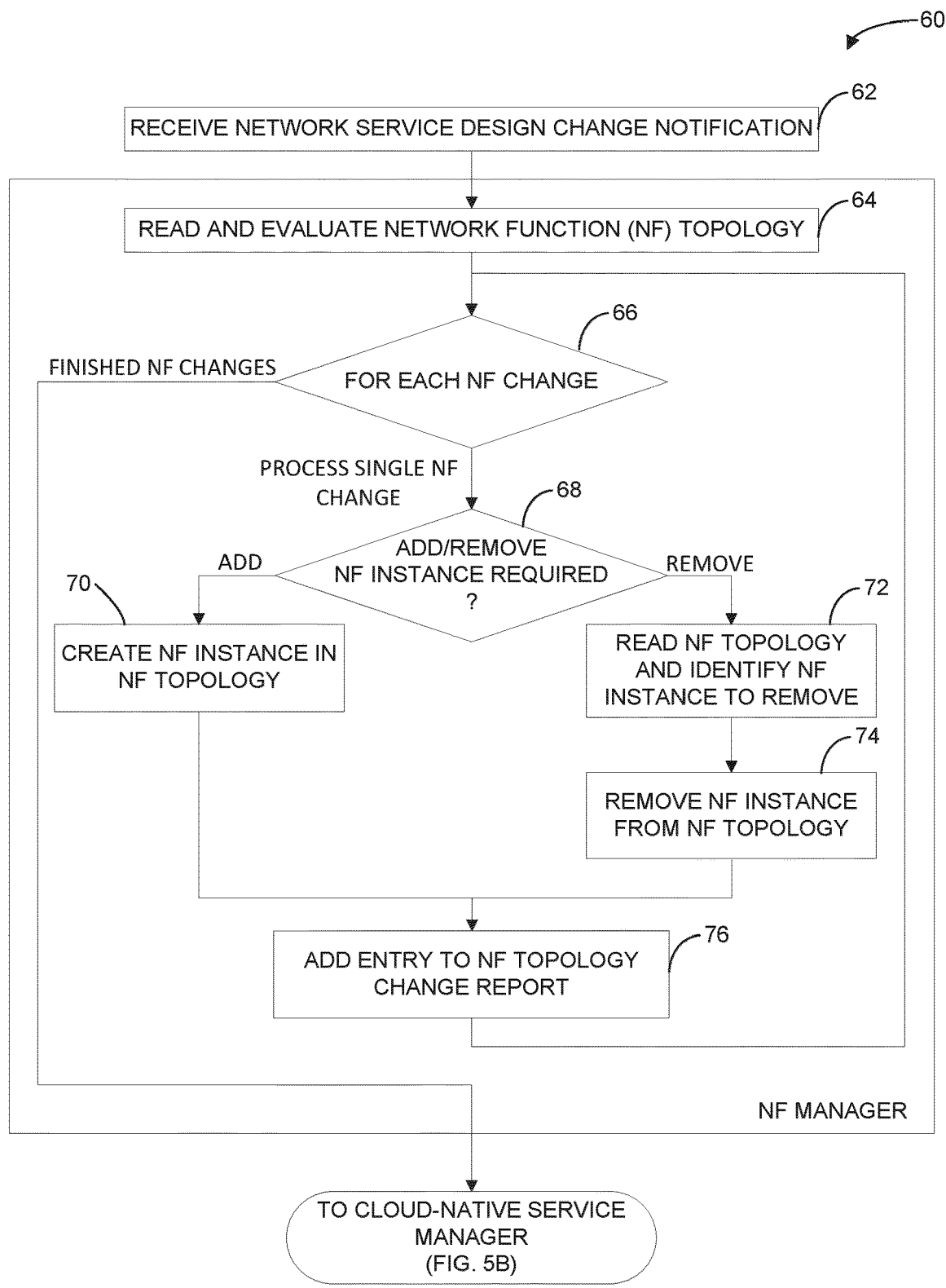
FIGS. 5A-5D are flow diagrams illustrating a method, implemented by logic in the RAN Assurance and Deployment Automation function, for decoupling the NFs and the cloud-native services according to one embodiment of the present disclosure.
Figure 5B:
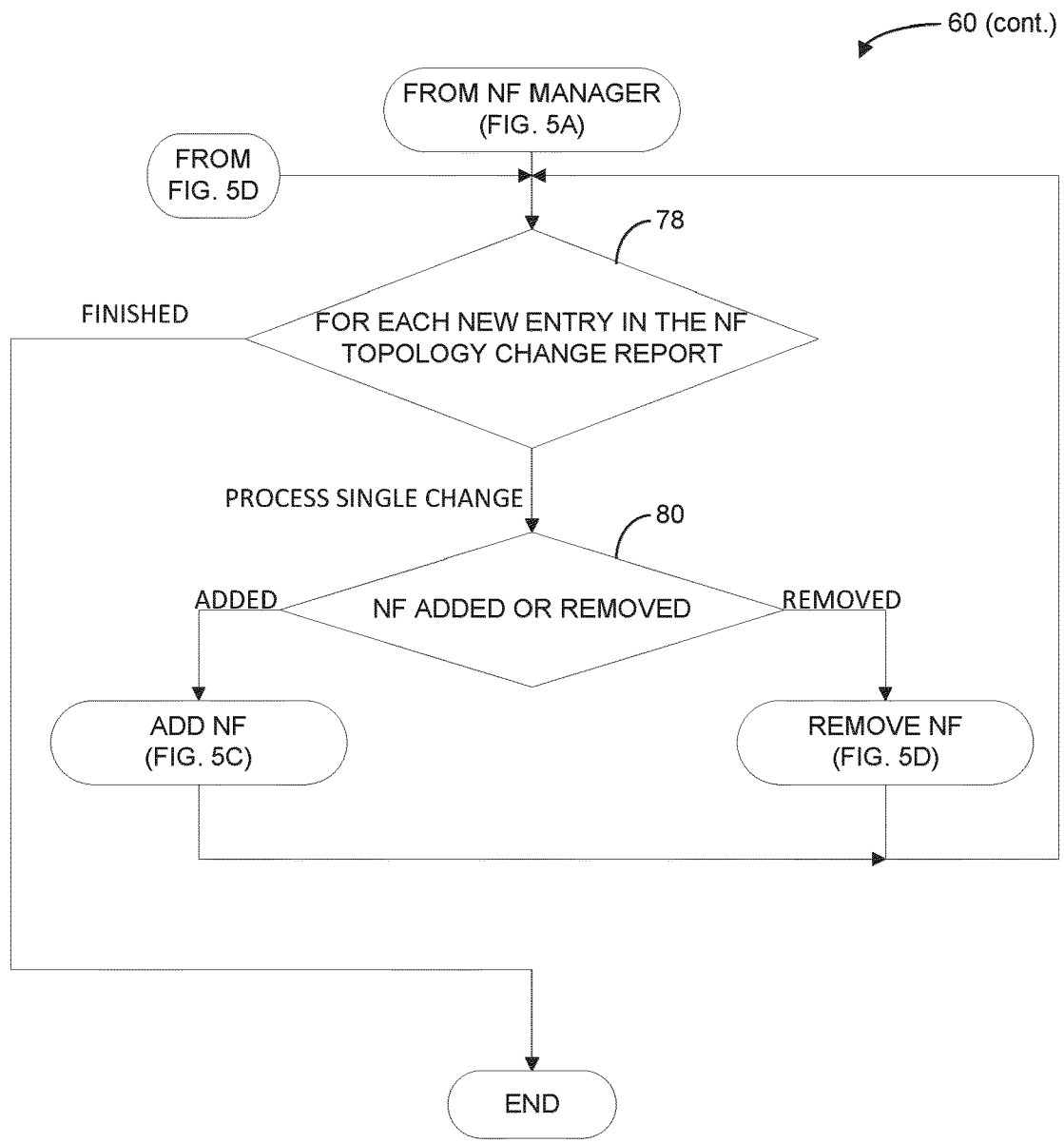
Figure 5C:
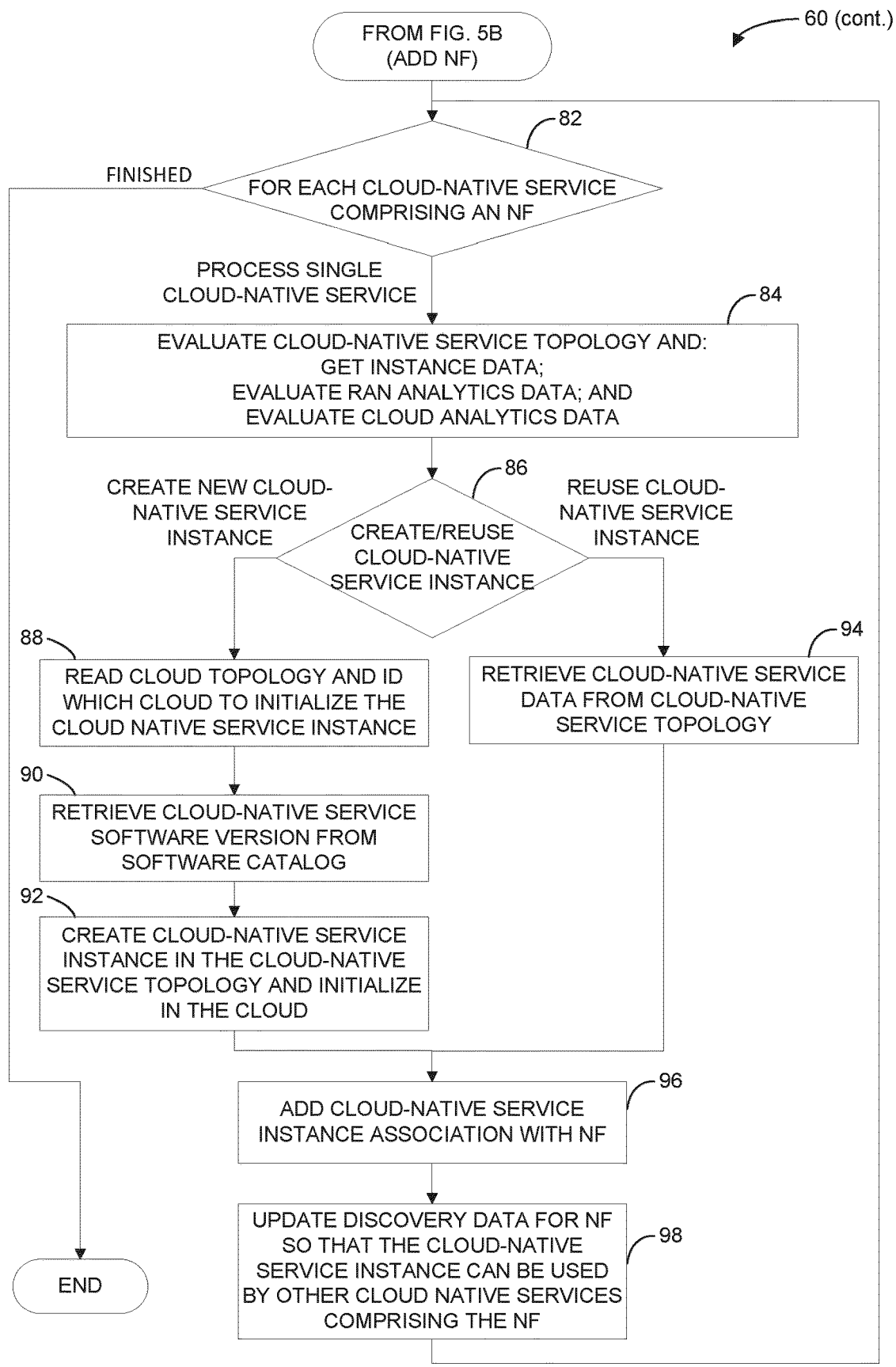
Figure 5D:
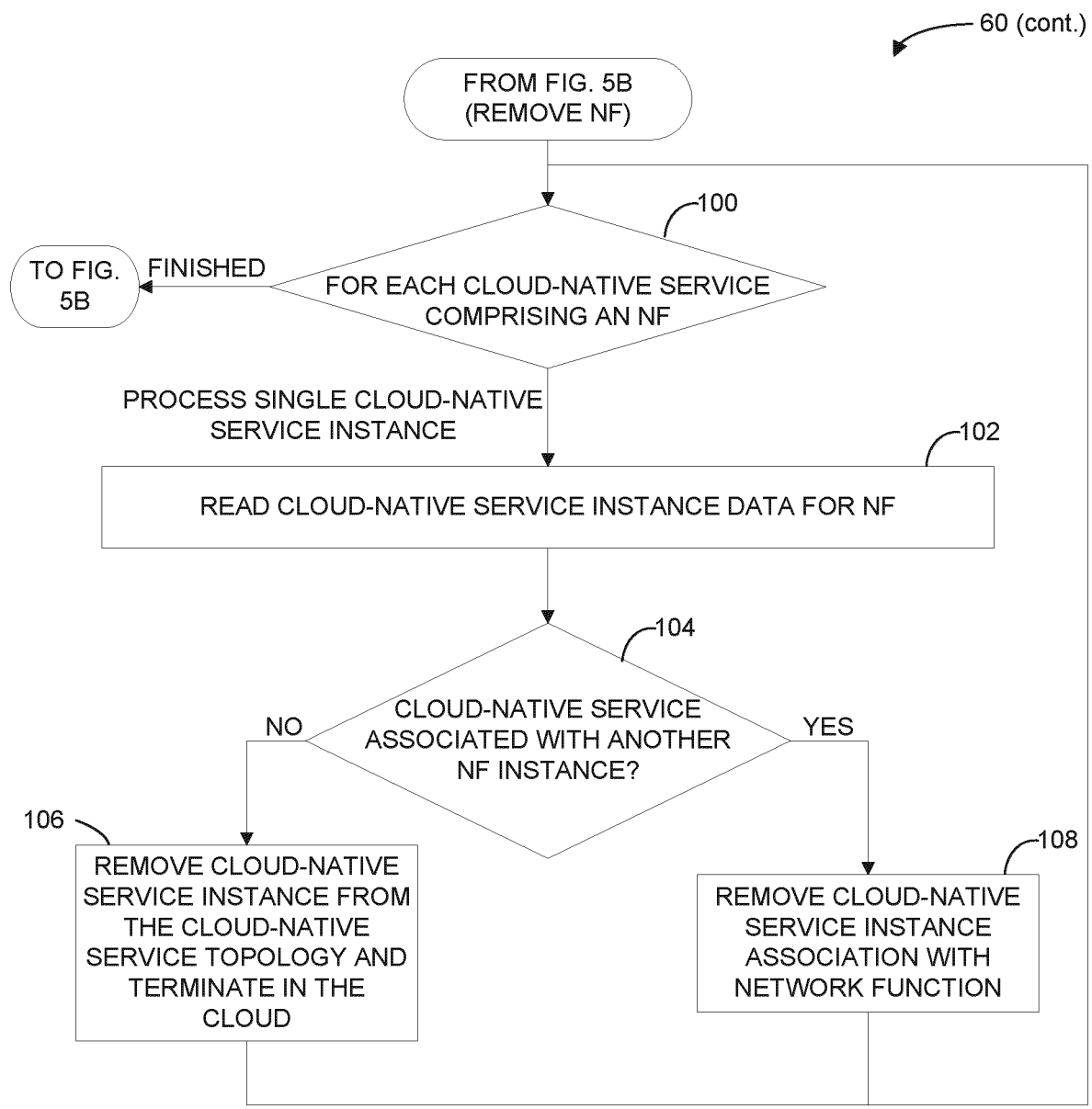

FIGS. 5A-5D are flow diagrams illustrating a method 60 for decoupling the NFs 32 and the cloud-native services 34 according to one embodiment of the present disclosure. Turning first to FIG. 5A, method 60 is implemented by the RAN Assurance and Deployment Automation function 30 executing on a network node, for example, and begins with receiving a network service design change notification (box 62). Upon receipt, the NF topology is read and evaluated (box 64). Then, for each change in the NF topology (box 66), the RAN Assurance and Deployment Automation function 30 determines whether the change indicates that an NF instance should be added or removed (box 66). If an NF instance is to be added, RAN Assurance and Deployment Automation function 30 creates a new NF instance in the NF topology (box 70). If the change indicates that an NF instance is to be removed, however, RAN Assurance and Deployment Automation function 30 reads the current NF topology to identify the particular instance to remove (box 72) and removes the NF instance from the NF topology (box 74). Regardless of whether an NF instance is added to, or removed from, the NF topology, the RAN Assurance and Deployment Automation function 30 adds an entry to the NF topology change report (box 76). Once all the changes in the NF topology have been processed, the NF topology change report is sent to a cloud-native service manager function (FIG. 5B). Then, for each new entry in the NF topology change report (box 78), it is determined whether an NF is added or removed (box 80). If a NF has been added, method 60 continues with adding the NF (FIG. 5C). Otherwise, if an NF is being removed, method 60 continues with removing the NF function (FIG. 5D).

Adding/Reusing a Network Function

Turning to FIG. 5C, for each cloud-native service comprising an NF (box 82), the cloud-native service topology is evaluated. This includes, but may not be limited to, obtaining the instance data and evaluating both the RAN Analytics data and the Cloud Analytics data (box 84). So evaluated, it is determined whether a new cloud-native service instance should be created, or an existing cloud-native service instance simply re-used (box 86). If it is determined that a new cloud-native service instance should be created, method 60 calls for reading the cloud topology to identify the particular cloud in which to initialize the cloud-native service instance being added. The cloud-native service software version is then obtained (e.g., retrieved from the software catalog) (box 90) and the cloud-native service instance is created in the cloud-native service topology and initialized in the cloud (box 92).

As seen in FIG. 5C, adding an NF instance need not always require the creation of a new cloud-native service instance. In some embodiments, such creation may simply re-use an existing cloud-native service instance. In these situations, when it is determined to re-use an NF instance, method 60 calls for retrieving the cloud-native service data from the cloud-native service topology (box 94).

Regardless, method 60 then adds an entry associating the cloud-native service instance with the NF (box 96) and updates the discovery data for the NF such that the cloud-native service instance can be used by other cloud-native services that comprise the NF (box 98). Once all entries have been processed (box 82), method 60 ends.

Removing a Network Function

Turning to FIG. 5D, for each cloud-native service comprising an NF (box 100), method 60 reads the cloud-native service instance data for the NF (box 102). If the cloud-native service is not already associated with another NF instance (box 104), method 60 calls for removing the cloud-native service instance in the cloud-native service topology and terminating the instance in the cloud (box 106). However, if the cloud-native service is already associated with another NF instance (box 106) method 60 calls for removing the cloud-native service instance's association with the NF (box 108). Once complete, method 60 returns to processing the next new entry in the NF topology change report (box 78—FIG. 5B).

Figure 6:
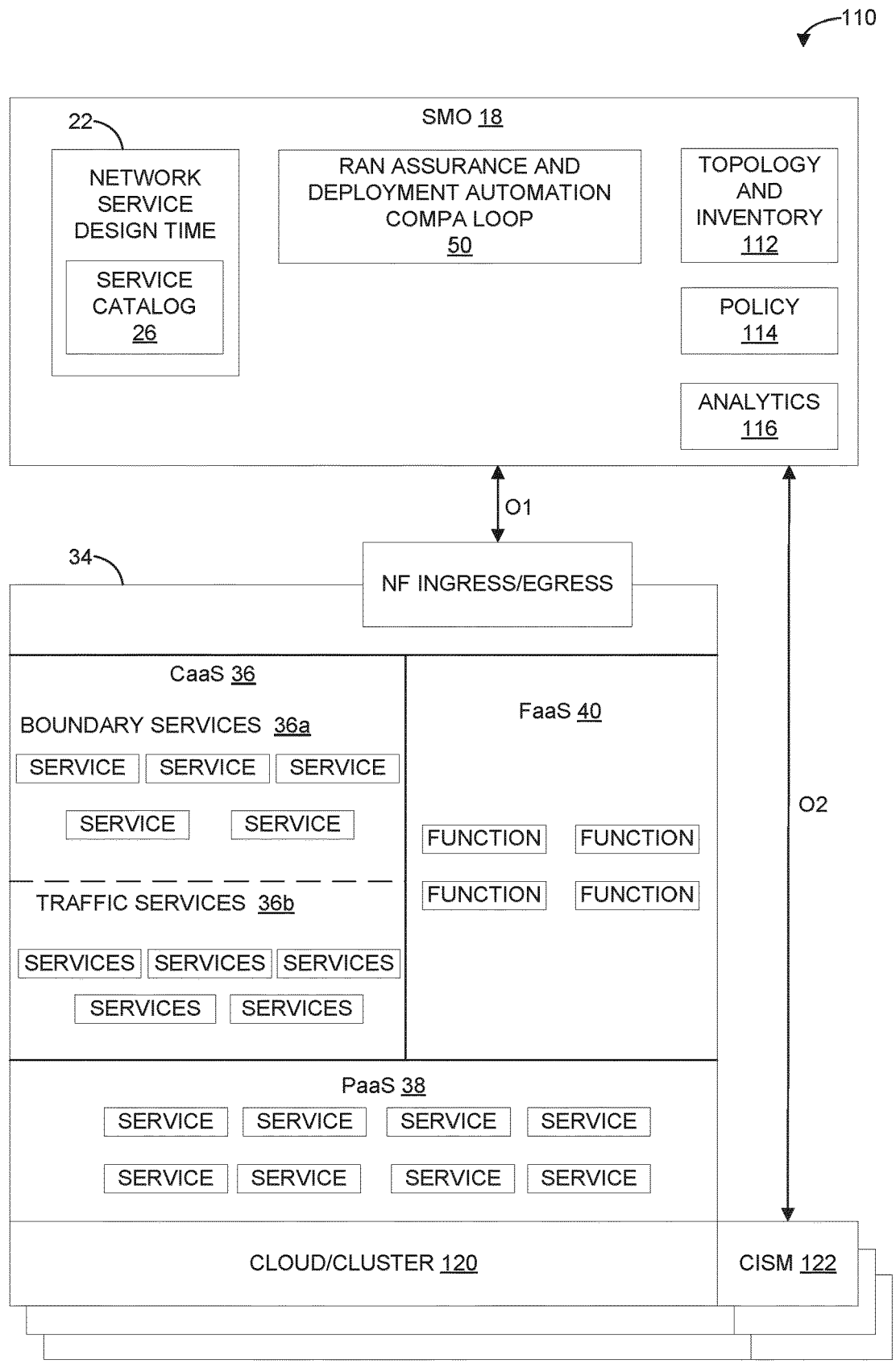
FIG. 6 is a functional block diagram illustrating deployment of the present embodiments in an O-RAN and the SMO platform according to one embodiment of the present disclosure.

FIG. 6 is a functional block diagram illustrating deployment of the present embodiments in an O-RAN 110 environment according to one embodiment of the present disclosure. As seen in FIG. 6, the O-RAN 110 environment comprises an SMO platform 18 and the cloud-native services 34. The SMO platform 18 comprises the previously described COMPA loop 50, a topology and inventory function 112, a policy function 114, an analytics function 116, and the Network Service Design time function 22, including software catalog 26. The SMO platform 18 is operatively connected to an NF ingress/egress interface of the cloud-native services 34 via an O1 interface to facilitate O&M, and to a (CISM) 122 interface via an O2 interface to facilitate life cycle management.

The cloud-native services 34 execute in the cloud/cluster 120 and, as previously described, comprises the Caas, PaaS, and FaaS cloud service models 36, 38, 40. Each of the Caas, PaaS, and FaaS cloud service models 36, 38, 40 comprises their own services, with the CaaS cloud service module 36 comprising boundary services 36a and traffic services 36b.

In the embodiment of FIG. 6, the RAN Assurance and Deployment Automation function 30 executes in the SMO 18 and has access to the following:

The network service design information, as well as the VNFs that compose the network service and the associated software. When designing the network, policies can also be designed to control the Radio Access Network Assurance and Deployment Automation functionality;

The cloud and radio Infrastructure information in the Topology & Inventory received over the O2 interface of O-RAN 110; and Analytics at various levels. These may include, but are not limited to, the cloud, the cloud-native service and NF, and the network service. The raw data is received over the O1 and O2 interfaces.

Armed with this information, the policy driven RAN Assurance and Deployment Automation function 30 can realize the following:

NFs can be shown in the Topology & Inventory, with addressing information for the O&M O1 interface;

Cloud-native services can be managed across various clouds and cloud service models, such as the CaaS, FaaS, and PaaS cloud service models 36, 38, 40;

Boundary services 36a can realize the O&M O1 interface, as well as the 3GPP defined F1-C, F1-U, E1, Xn/X2, and NG/S1 interfaces, thereby routing API traffic to the correct cloud-native services; and Ingress and egress configuration to allow external communication.

FIGS. 7-15 are flow diagrams illustrating methods for decoupling the NFs and the cloud-native services according to one embodiment of the present disclosure. In these embodiments, the methods are implemented at a network node.

Figure 7:
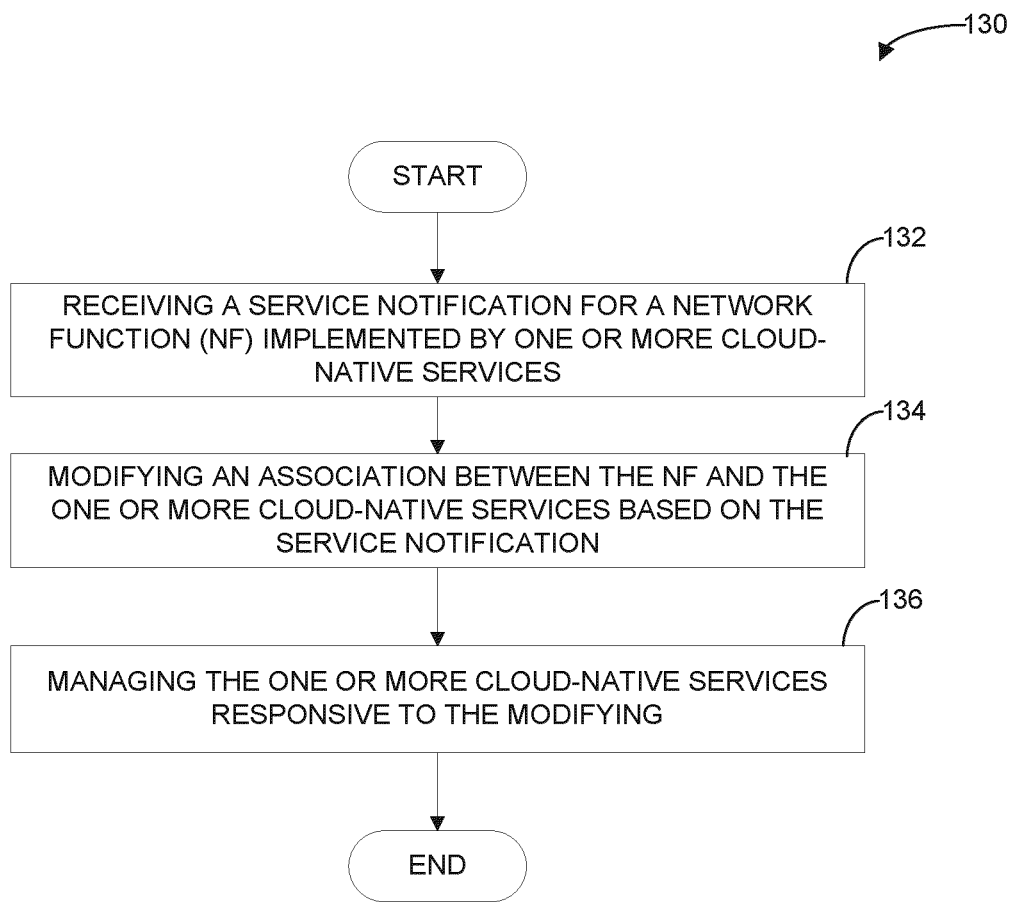
FIGS. 7-15 are flow diagrams illustrating methods for decoupling the NFs and the cloud-native services according to one embodiment of the present disclosure.

More particularly, FIG. 7 is a flow diagram illustrating a method 130 for managing cloud-native services associated with a network, such as a Radio Access Network (RAN). As seen in FIG. 7, method 130 begins with the network node receiving a service notification for a NF implemented by one or more cloud-native services (box 132). For example, as previously described in FIG. 5A, the service notification may comprise a network service design change notification. Then, based on the service notification, the node then modifies an association between the NF and the one or more cloud-native services (box 134). So modified, the node begins managing the one or more cloud-native services responsive (box 136).

In one embodiment, the NF comprises one or more of a gNB-CU-CP NF, a gNB-CU-UP NF, and a gNB-DU NF.

In one embodiment, the service notification comprises a network service design change notification indicating that the NF has been added or removed.

In one embodiment, the service notification comprises at least one of a network service design change notification and runtime analytics data. The network service design change notification indicates at least one of a change to the NF, a change to software associated with the NF, and a change to a cloud infrastructure of the cloud network. The runtime analytics data comprises the analytics data for one or both of a Radio Access Network (RAN) and the network.

In one embodiment, the change to the cloud infrastructure comprises a change to the availability and/or characteristics of one or more resources of the cloud network associated with the one or more cloud-native services.

In one embodiment, the one or more resources comprise one or more compute resources, memory resources, and networking resources of the cloud network.

In one embodiment, the RAN analytics data comprises aggregated data associated with the NF, and/or raw data associated with the one or more cloud-native services.

In one embodiment, the service notification is received over an O1 or O2 interface.

Figure 8:
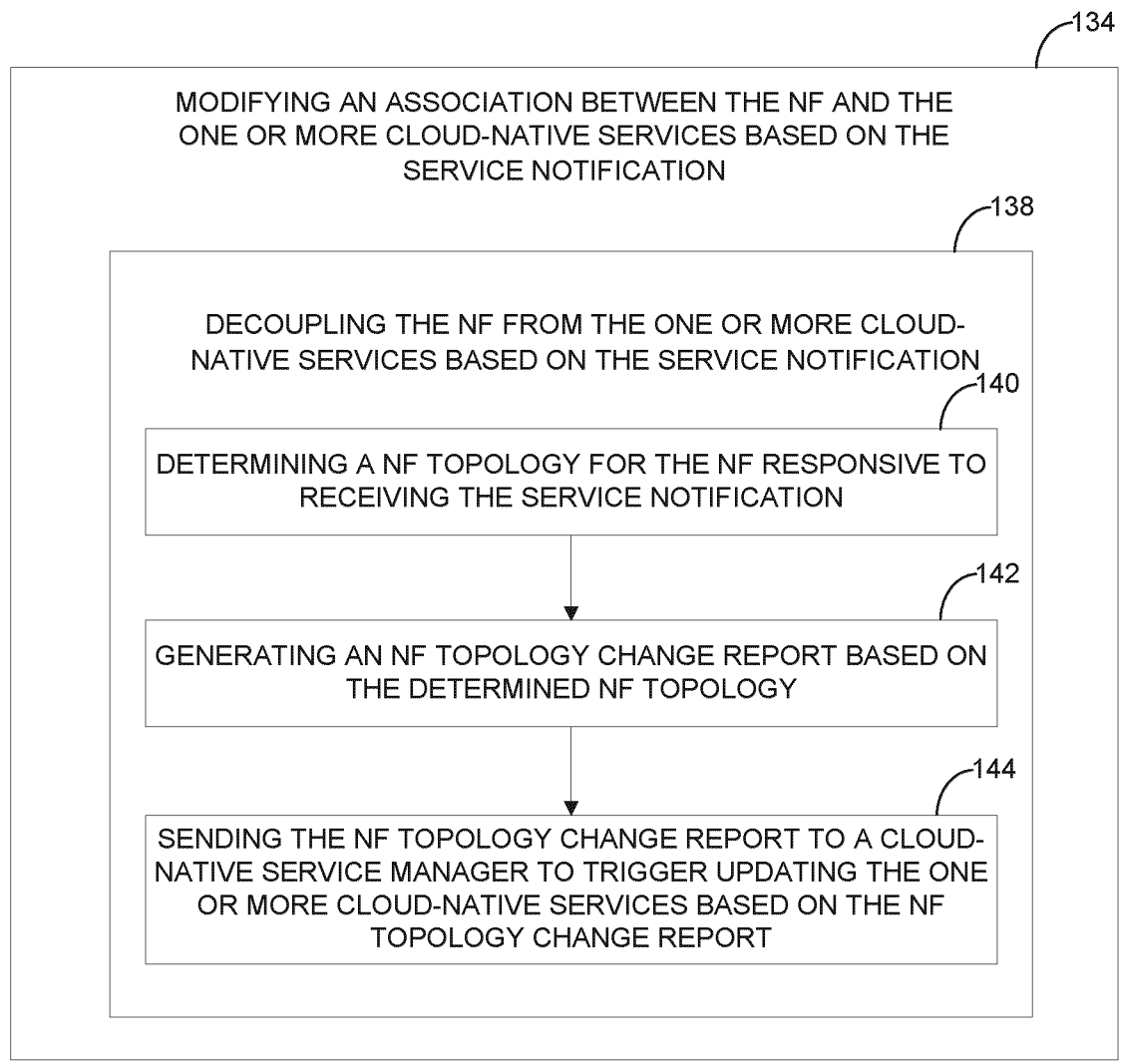

FIG. 8 is a flow diagram illustrating how the network node modifies (box 134) the association between the NF and the one or more cloud-native services according to one embodiment. Particularly, in one embodiment, modifying the association comprises the network node decoupling the NF from the one or more cloud-native services based on the service notification (box 138). To accomplish the decoupling, the network node determines a NF topology for the NF responsive to receiving the service notification (box 140), and then generates an NF topology change report based on the determined NF topology (box 142). Once the report has been generated, the network node sends the NF topology change report to a cloud-native service manager to trigger updating the one or more cloud-native services based on the NF topology change report (box 144).

Figure 9:
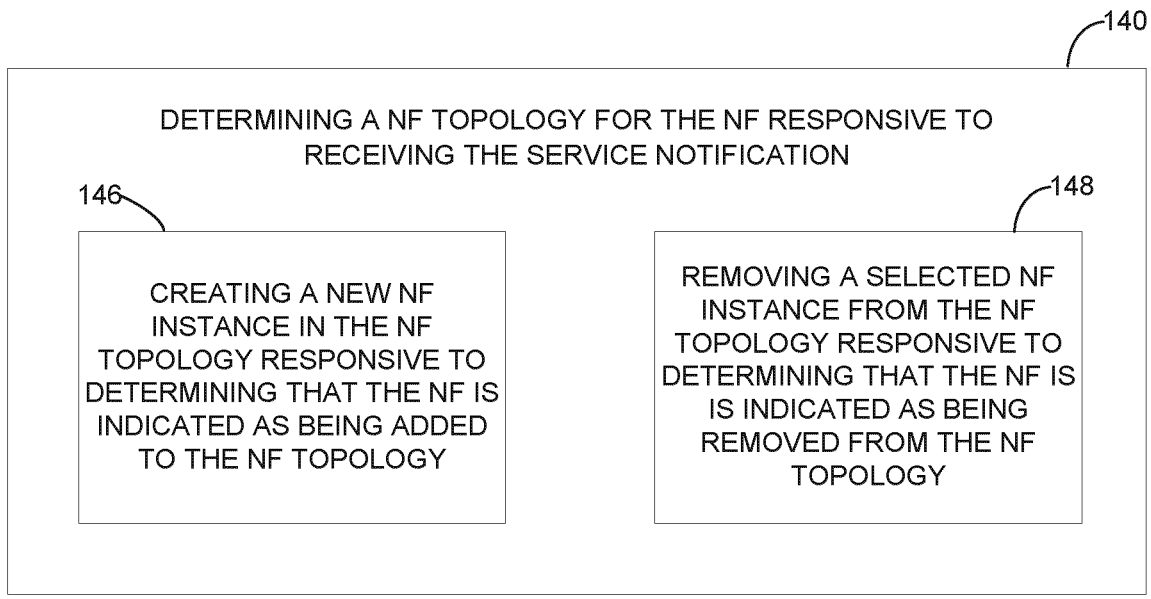

FIG. 9 is a flow diagram illustrating how the network node determines a NF topology (box 140) according to embodiments of the present disclosure. As seen in FIG. 9, the network node can either add a new NF instance or remove an existing NF instance. If adding an NF, the network node creates a new NF instance of the NF in the NF topology (box 146). If removing an NF, however, the network node removes a selected NF instance from the NF topology (box 148).

Figure 10:
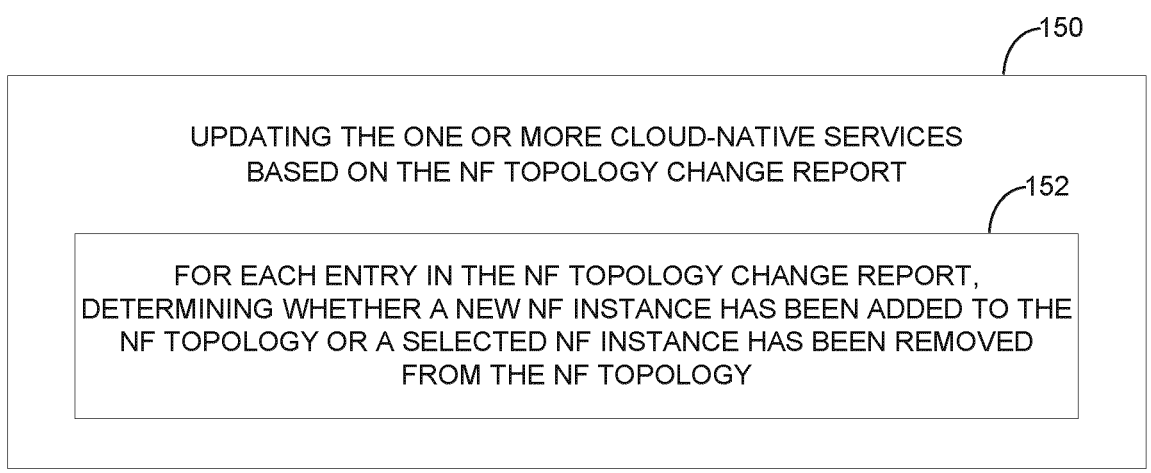

FIG. 10 is a flow diagram illustrating a method by which the network node updates the one or more cloud-native services based on the NF topology change report (box 150). In this embodiment, the network node analyzes each entry in the NF topology change report, each of which represents a change to the NF topology. For each entry, the network node determines whether a new NF instance has been added to the NF topology or a selected NF instance has been removed from the NF topology (box 152). So determined, the network node can update the NF topology to either add the new NF instance, or to remove the identified selected NF instance, as described above in FIG. 9.

Figure 11:
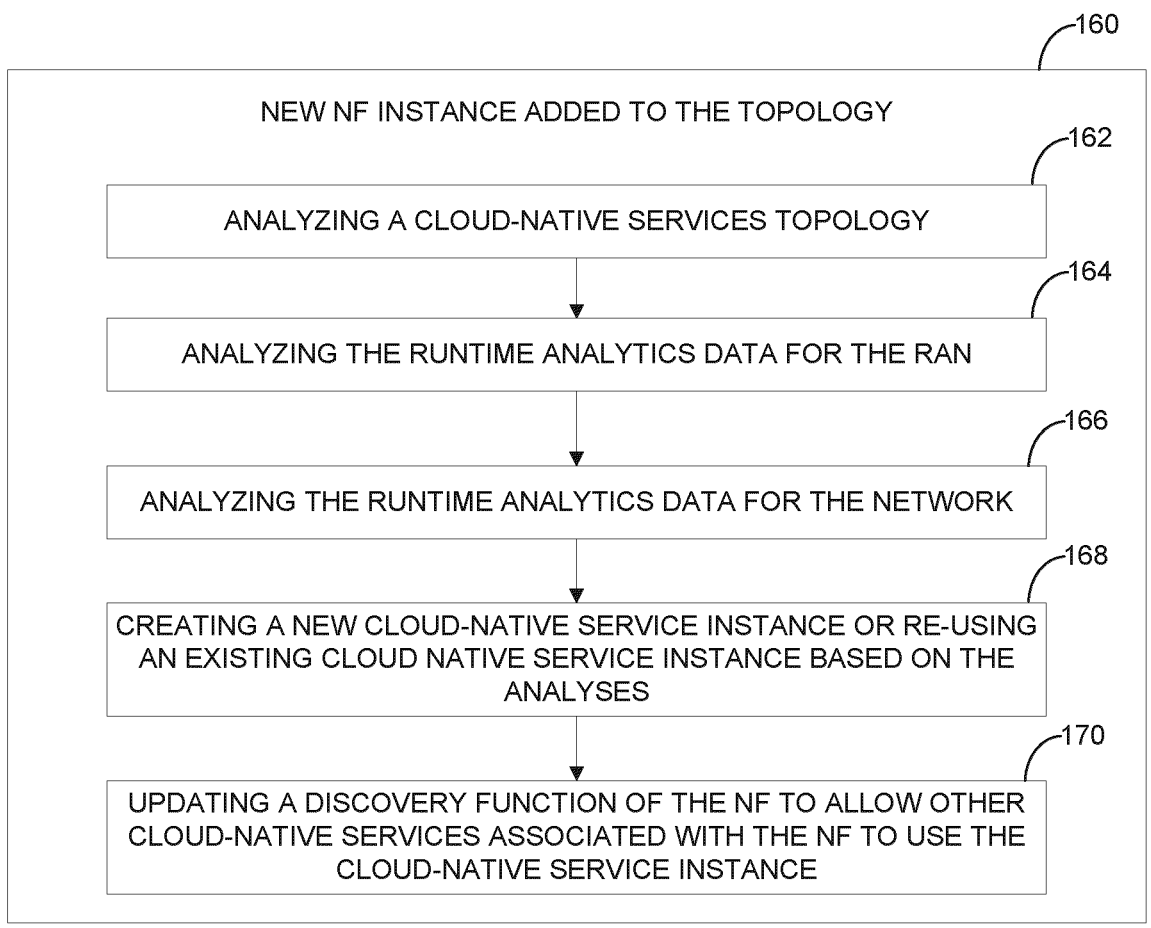

FIG. 11 is a flow diagram illustrating a method 160 by which the network node adds a new NF instance to the NF topology. As seen in FIG. 11, for each of the one or more cloud-native services comprising the NF, the network node analyzes a cloud-native services topology (box 162), the runtime analytics data for the RAN (box 164), and the runtime analytics data for the network (box 166). Based on the results of the analysis, the network node creates a new cloud-native service instance for the NF or re-uses an existing cloud native service instance for the NF (box 168), and updates the discovery function of the NF so that other cloud-native services associated with the NF are able to use the cloud-native service instance (box 170).

Figure 12:
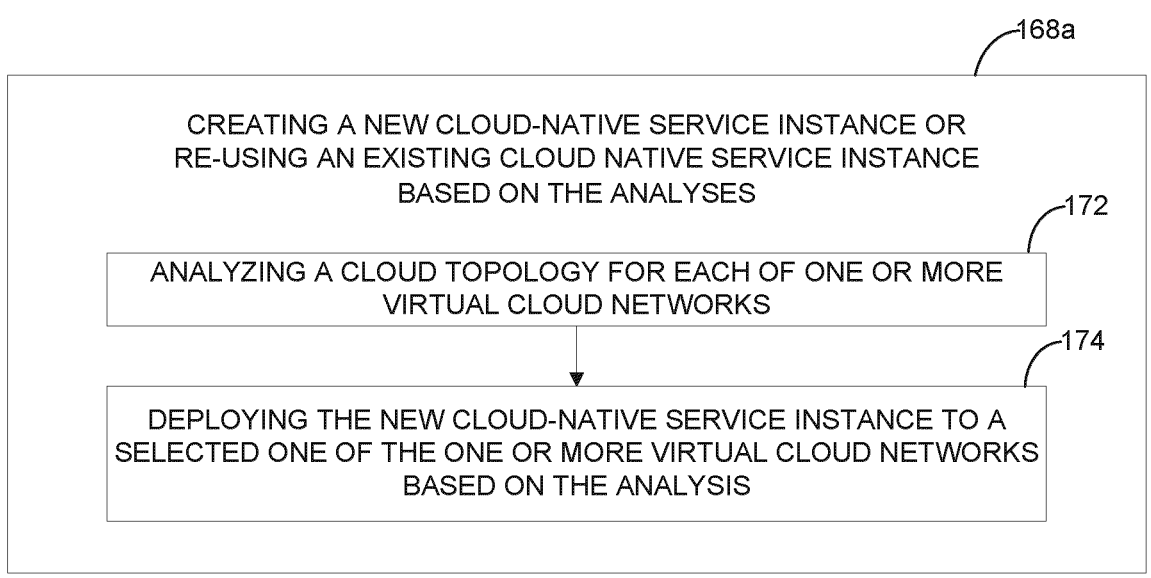
Figure 13:
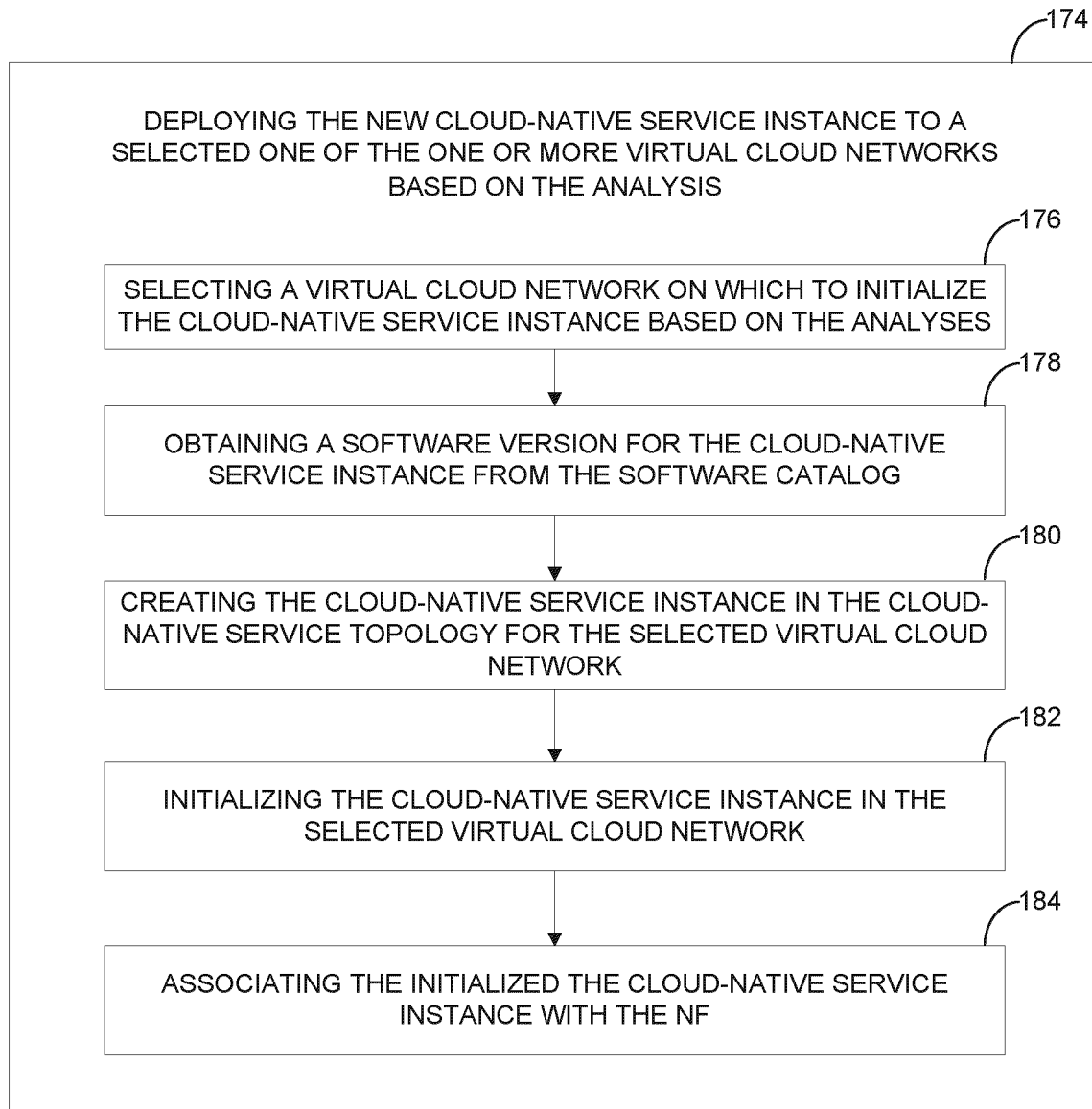
Figure 14:
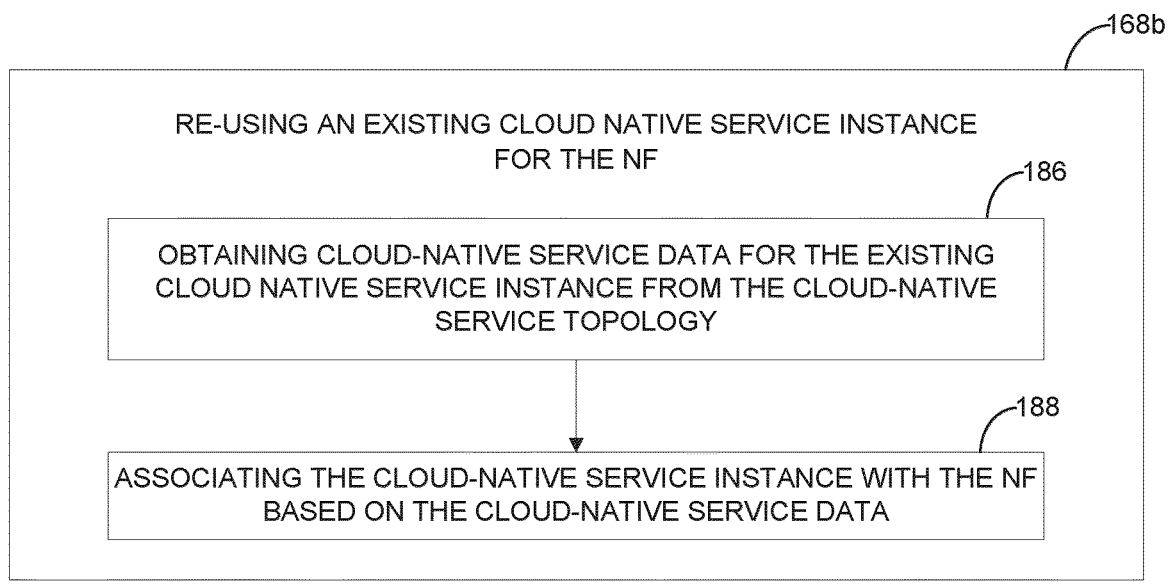

FIGS. 12-14 are flow diagrams illustrating how the network node creates a new cloud-native service instance for the NF (FIG. 12—box 168a) and re-uses an existing cloud native service instance for the NF (FIG. 14—box 168b), according to embodiments of the present disclosure. Particularly, as seen in FIG. 12, the network node analyzes a cloud topology for each of one or more virtual cloud networks (box 172), and then, based on the analysis, deploys the new cloud-native service instance to a selected one of the one or more virtual cloud networks (box 174).

FIG. 13 is a flow diagram illustrating how the network node deploys a newly-added cloud-native service instance to a selected virtual cloud network based on the analysis of FIG. 12, according to one embodiment (box 174). Particularly, the network node first selects a virtual cloud network on which to initialize the cloud-native service instance based on the analyses (box 176). Then the node obtains a software version for the cloud-native service instance (box 178). In one embodiment, the software version may be obtained from software catalog 26. Once the information has been obtained, the network node creates the cloud-native service instance in the cloud-native service topology for the selected virtual cloud network (box 180), initializes the cloud-native service instance in the selected virtual cloud network (box 182), and associates the initialized the cloud-native service instance with the NF (box 184).

To re-use an existing cloud-native service instance (FIG. 14—box 168b), the network node obtains cloud-native service data for the existing cloud native service instance from the cloud-native service topology (box 186). Then, based on the cloud-native service data, the network node associates the cloud-native service instance with the NF (box 188).

Figure 15:
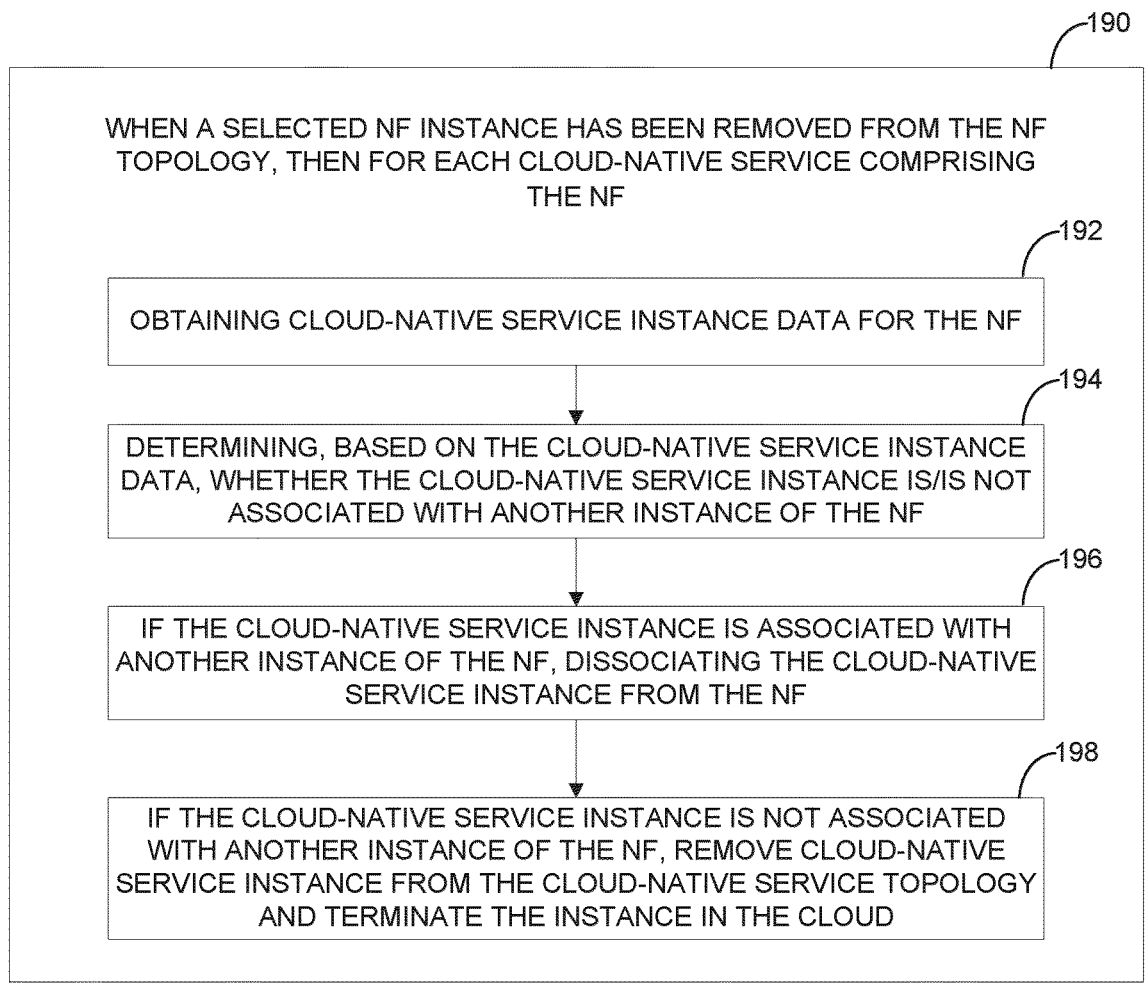

FIG. 15 is a flow diagram illustrating a process for when a selected NF instance has been removed from the NF topology according to one embodiment (box 190). Particularly, for each cloud-native service that comprises the NF, the network node obtains the cloud-native service instance data for the NF (box 192). Then, based on the cloud-native service instance data, the network node determines whether the cloud-native service instance is/is not associated with another instance of the NF (box 194). If the cloud-native service instance is associated with another instance of the NF, the network node dissociates the cloud-native service from the NF (box 196). If the cloud-native service instance is not associated with another instance of the NF, however, the network node removes the cloud-native service instance of the NF from the cloud-native service topology and terminates the instance in the cloud (box 198).

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 16:
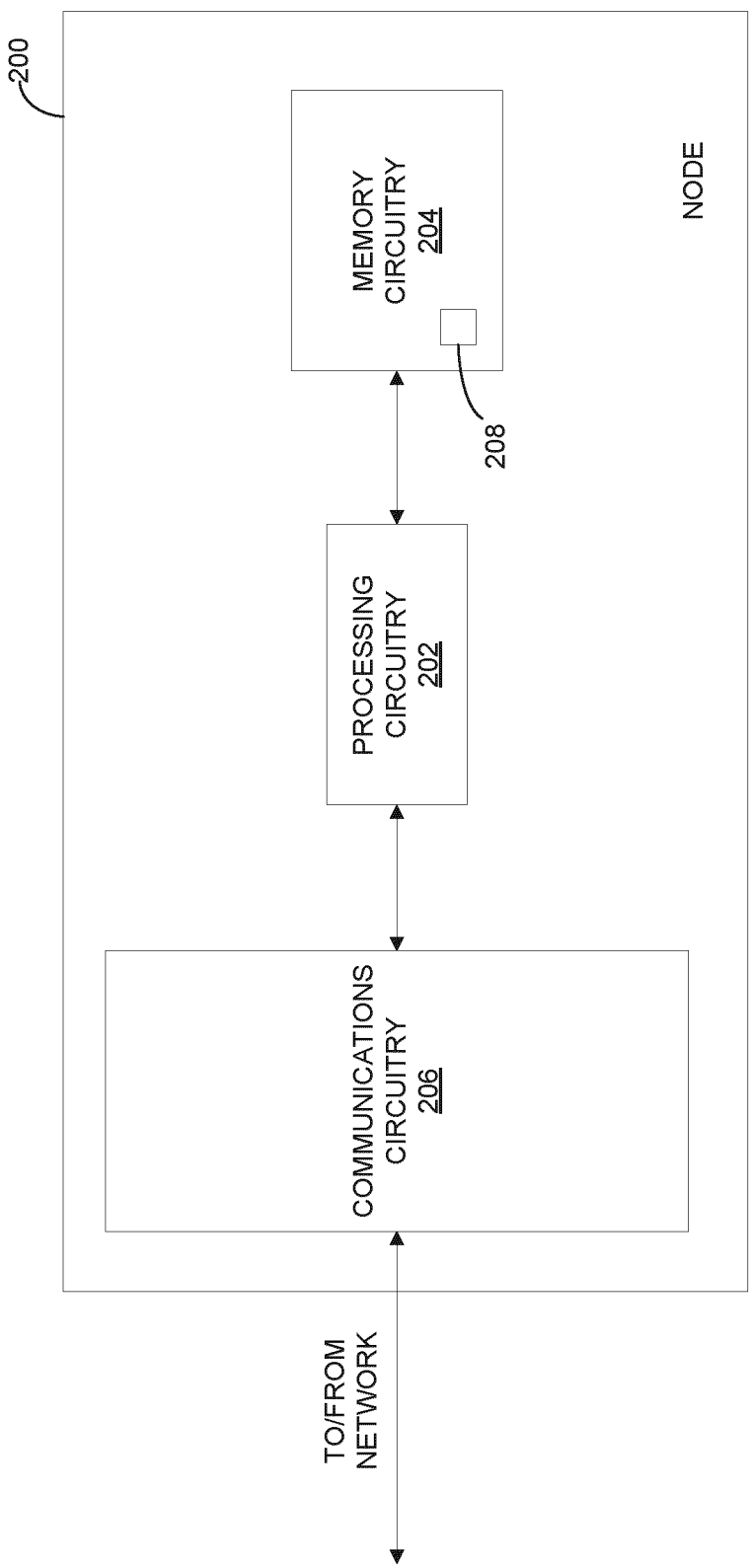
FIG. 16 is a functional block diagram of a network node configured to decouple the NFs and the cloud-native services according to one embodiment of the present disclosure.

FIG. 16 is a functional block diagram of a network node configured to decouple the NFs and the cloud-native services according to one embodiment of the present disclosure.

The network node 200 may, for example, be any node performing an NF as seen in FIG. 1. In one embodiment, however, network node 200 comprises a Policy and Charging Control node. In other embodiments, such as in an O-RAN environment, the network node 200 may comprise an SMO.

As seen in FIG. 16, network node 200 comprises processing circuitry 202, memory circuitry 204, and communications circuitry 206. In addition, memory circuitry 204 stores a computer program 208 that, when executed by processing circuitry 202, configures network node 200 to implement the methods of FIGS. 5A-5D and 6-15 as herein described.

In more detail, the processing circuitry 202 controls the overall operation of network node 200 and processes the data and information it receives from other sends and receives to/from other nodes. Such processing includes, but is not limited to, receiving a service notification for a Network Function (NF) implemented by one or more cloud-native services, modifying an association between the NF and the one or more cloud-native services based on the service notification, and managing the one or more cloud-native services responsive to the modifying, as previously described. In this regard, the processing circuitry 202 may comprise one or more microprocessors, hardware, firmware, or a combination thereof.

The memory circuitry 204 comprises both volatile and non-volatile memory for storing computer program code and data needed by the processing circuitry 202 for operation. Memory circuitry 204 may comprise any tangible, non-transitory computer-readable storage medium for storing data including electronic, magnetic, optical, electromagnetic, or semiconductor data storage. As stated above, memory circuitry 204 stores a computer program 208 comprising executable instructions that configure the processing circuitry 202 to implement the methods herein described. A computer program 208 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 208 for configuring the processing circuitry 202 as herein described may be stored in a removable memory, such as a portable compact disc, portable digital video disc, or other removable media. The computer program 208 may also be embodied in a carrier such as an electronic signal, optical signal, radio signal, or computer readable storage medium.

The communication circuitry 206 communicatively connects network node 200 to one or more other nodes in CN 10, as is known in the art. As such, communications circuitry 206 may comprise, for example, any circuitry configured to communicate with the NFs executing on the nodes in CN 10 using any well-known interface.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 17:
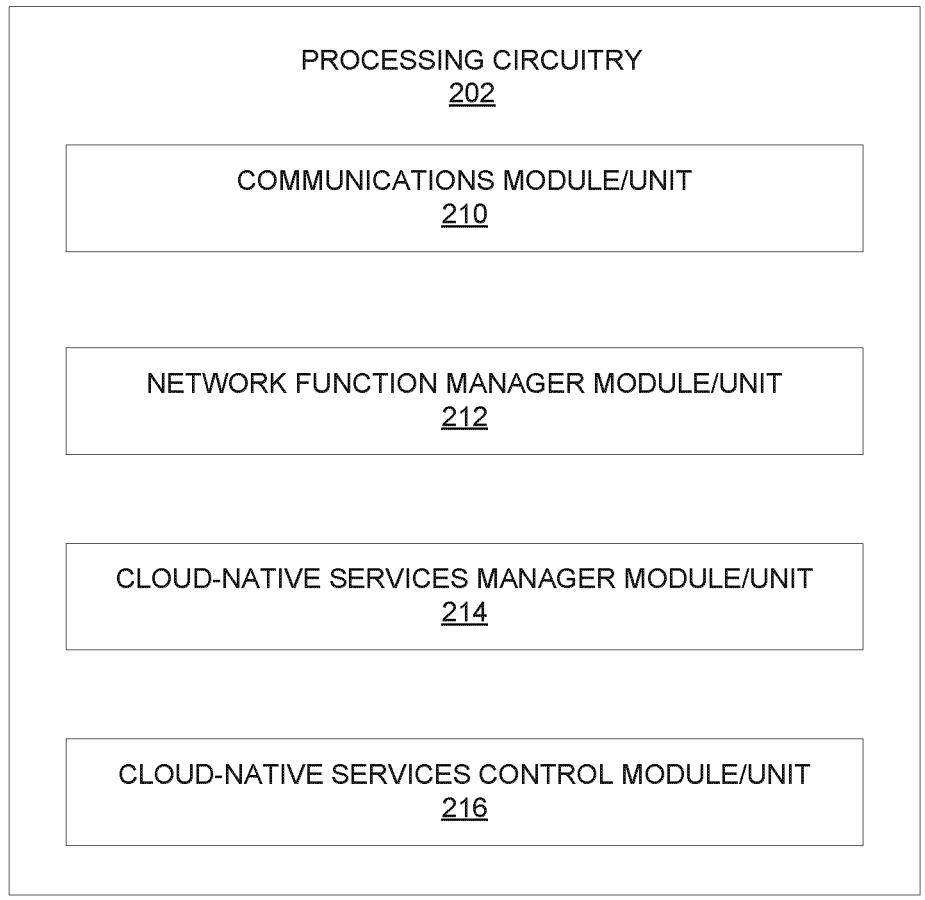
FIG. 17 is a functional block diagram illustrating a computer program product for decoupling the NFs and the cloud-native services according to one embodiment of the present disclosure.

FIG. 17 is a functional block diagram illustrating a computer program product for managing cloud-native services according to one embodiment of the present disclosure. As seen in FIG. 17, computer program 208 comprises a communications module/unit 210, an NF manager module/unit 212, a cloud-native services manager module/unit 214, and a cloud-native services control module/unit 216.

When computer program 208 is executed by processing circuitry 202, the communications module/unit 210 configures network node 200 to communicate with the other NFs in CN 10 to receive service notifications, and to send and/or receive the generated NF topology change reports, as previously described. The NF manager module/unit 212 configures network node 200 to modify the association between the NF and the one or more cloud-native services based on the service notification, as previously described.

The cloud-native services manager module/unit 214 configures network node 200 to add, remove, and/or update NF instances, as previously described. The cloud-native services control module/unit 216 configures network node 200 to then manage and control the cloud-native services, decoupled from the NF instances, as previously described.

Embodiments further include a carrier containing such computer program 208. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method, implemented by a Network Function (NF) manager node in a communications network, for managing cloud-native services associated with a Radio Access Network (RAN), the method comprising:
 receiving a service notification for a NF, implemented by one or more cloud-native services;
 modifying an association between the NF and the one or more cloud-native services based on the service notification, wherein modifying the association between the NF and the one or more cloud-native services comprises the NF manager node:
  determining a NF topology for the NF responsive to receiving the service notification;
  generating an NF topology change report based on the determined NF topology;
  and sending the NF topology change report to a cloud-native service manager to trigger updating the one or more cloud-native services based on the NF topology change report;
 and managing the one or more cloud-native services responsive to the modifying; and
 wherein when a new NF instance has been added to the NF topology, the method further comprises, for each of the one or more cloud-native services comprising the NF:
  analyzing a cloud-native services topology;
  analyzing runtime analytics data for the RAN;
  analyzing runtime analytics data for the communications network; and
  creating a new cloud-native service instance or re-using an existing cloud native service instance, based on the analyses of the cloud-native services topology, the runtime analytics data for the RAN, and the runtime analytics data for the communications network.

2. The method of claim 1 wherein determining a NF topology for the NF comprises:
 for each NF in the NF topology, the NF manager node:
  creating a new NF instance in the NF topology responsive to determining that the NF is indicated as being added to the NF topology; or
  removing a selected NF instance from the NF topology responsive to determining that the NF is indicated as being removed from the NF topology.

3. The method of claim 1 wherein updating the one or more cloud-native services based on the NF topology change report comprises, for each entry in the NF topology change report, determining whether a new NF instance has been added to the NF topology or a selected NF instance has been removed from the NF topology.

4. The method of claim 1 wherein re-using an existing cloud native service instance for the NF comprises:
 obtaining cloud-native service data for the existing cloud native service instance from the cloud-native service topology of a virtual cloud network associated with the existing cloud native service instance; and
 associating the cloud-native service instance with the NF based on the cloud-native service data.

5. The method of claim 1 further comprising updating a discovery function of the NF to allow other cloud-native services associated with the NF to use the cloud-native service instance.

6. The method of claim 2 wherein when a selected NF instance has been removed from the NF topology, the method further comprises, for each cloud-native service comprising the NF:
 obtaining cloud-native service instance data for the NF; and
 determining, based on the cloud-native service instance data, whether the cloud-native service instance is not associated with another instance of the NF.

7. The method of claim 6, wherein if the cloud-native service instance is not associated with another instance of the NF, the method further comprises removing the cloud-native service instance of the NF from a cloud-native service topology and terminating the cloud-native service instance in the cloud.

8. A Network Function (NF) manager node in a communications network configured to manage cloud-native services associated with a Radio Access Network (RAN), the NF manager node comprising:
 communications interface circuitry configured to receive a service notification for a NF, implemented by one or more cloud-native services;
 processing circuitry communicatively connected to the communications interface circuitry; and
 memory comprising instructions executable by the processing circuitry such that the NF manager node is configured to:
 modify an association between the NF and the one or more cloud-native services based on the service notification, wherein to modify the association between the NF and the one or more cloud-native services the NF manager node is configured to:
  determine an NF topology for the NF responsive to receiving the service notification;
  generate an NF topology change report based on the determined NF topology; and
  send the NF topology change report to a cloud-native service manager to trigger updating the one or more cloud-native services based on the NF topology change report;
 and manage the one or more cloud-native services responsive to the modifying; and
 wherein when a new NF instance has been added to the NF topology, the instructions executable by the processing circuitry further configure the NF manager node to, for each of the one or more cloud-native services comprising the NF:
  analyze a cloud-native services topology;
  analyze runtime analytics data for the RAN;
  analyze runtime analytics data for the communications network; and
  create a new cloud-native service instance or re-using an existing cloud native service instance based on the analyses of the cloud-native services topology, the runtime analytics data for the RAN, and the runtime analytics data for the communications network.

9. The NF manager node of claim 8 wherein the NF comprises one or more of a gNB-CU-CP NF, a gNB-CU-UP NF, and a gNB-DU NF.

10. The NF manager node of claim 8 wherein to determine a NF topology for the NF, the instructions executable by the processing circuitry configure the NF manager node to:

for each NF in the NF topology:
 create a new NF instance in the NF topology responsive to determining that the NF is indicated as being added to the NF topology; or
 remove a selected NF instance from the NF topology responsive to determining that the NF is indicated as being removed from the NF topology.

11. The NF manager node of claim 8 wherein to update the one or more cloud-native services based on the NF topology change report, the instructions executable by the processing circuitry further configure the NF manager node to, for each entry in the NF topology change report, determine whether a new NF instance has been added to the NF topology or a selected NF instance has been removed from the NF topology.

12. The NF manager node of claim 8 wherein to create a new cloud-native service instance, the instructions executable by the processing circuitry further configure the NF manager node to:

analyze a cloud-native service topology for each of one or more virtual cloud networks; and
deploy the new cloud-native service instance to a selected one of the one or more virtual cloud networks based on the analysis.

13. The NF manager node of claim 8 wherein to re-use an existing cloud native service instance for the NF, the instructions executable by the processing circuitry further configures the NF manager node to:

obtain cloud-native service data for the existing cloud native service instance from the cloud-native service topology of a virtual cloud network associated with the existing cloud native service instance; and
associate the cloud-native service instance with the NF based on the cloud-native service data.

14. A non-transitory computer-readable medium comprising a computer program stored thereon, the computer program comprising instructions that, when executed by processing circuitry in a Network Function (NF) manager node configured to manage cloud-native services associated with a Radio Access Network (RAN), causes the NF manager node to:

receive a service notification for a NF, implemented by one or more cloud-native services;
modify an association between the NF and the one or more cloud-native services based on the service notification, wherein to modify the association between the NF and the one or more cloud-native services, the instructions, when executed by the processing circuitry, configures the NF manager node to:
 determine a NF topology for the NF responsive to receiving the service notification;
 generate an NF topology change report based on the determined NF topology; and
 send the NF topology change report to a cloud-native service manager to trigger updating the one or more cloud-native services based on the NF topology change report; and
manage the one or more cloud-native services responsive to the modifying; and
wherein when a new NF instance has been added to the NF topology, the instructions, when executed by the processing circuitry, further configure the NF manager node to, for each of the one or more cloud-native services comprising the NF:
 analyze a cloud-native services topology;
 analyze runtime analytics data for the RAN;
 analyze runtime analytics data for a communications network; and
 create a new cloud-native service instance or re-using an existing cloud native service instance based on the analyses of the cloud-native services topology, the runtime analytics data for the RAN, and the runtime analytics data for the communications network.

* * * * *